Patented Sept. 9, 1952

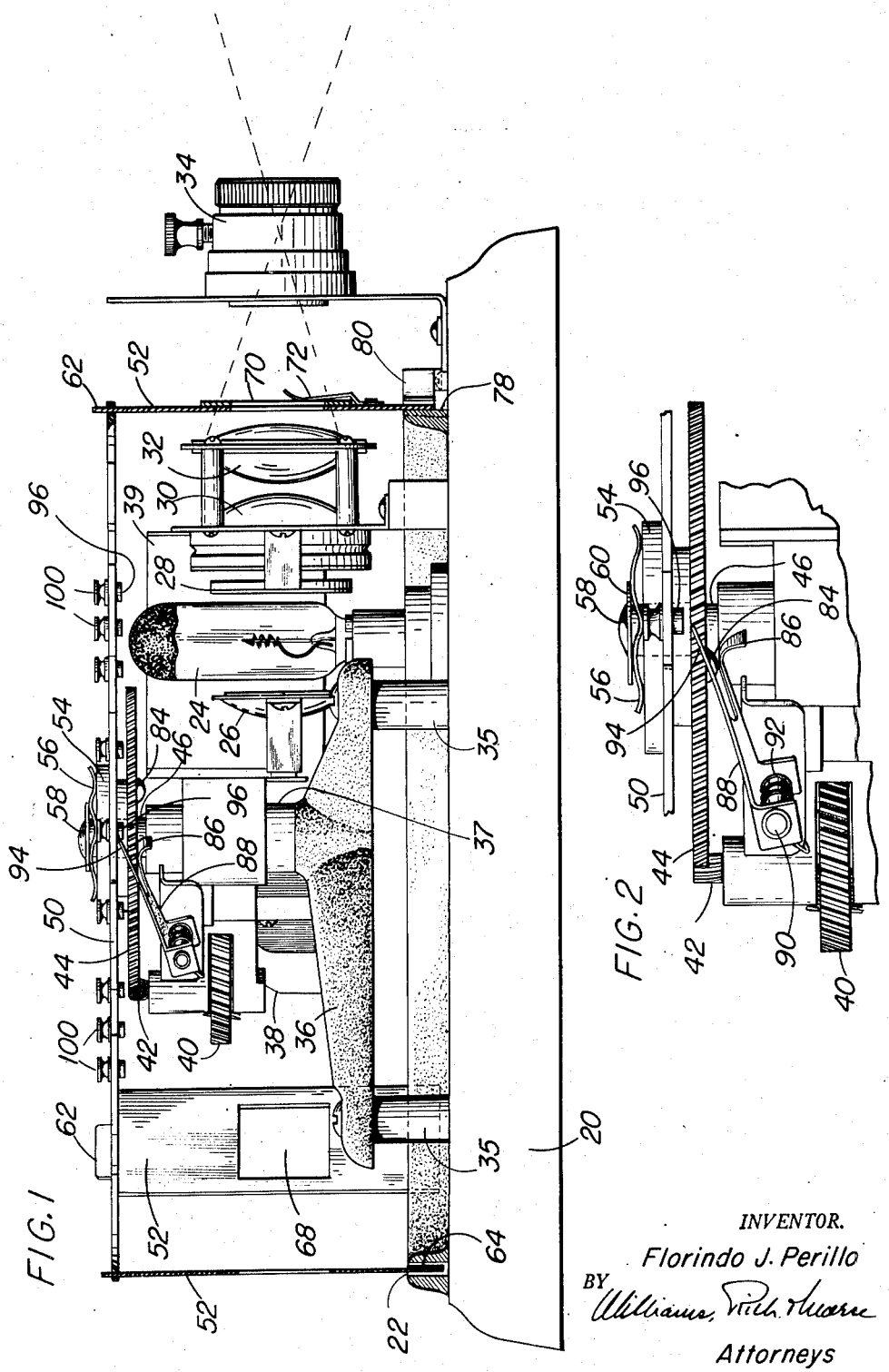

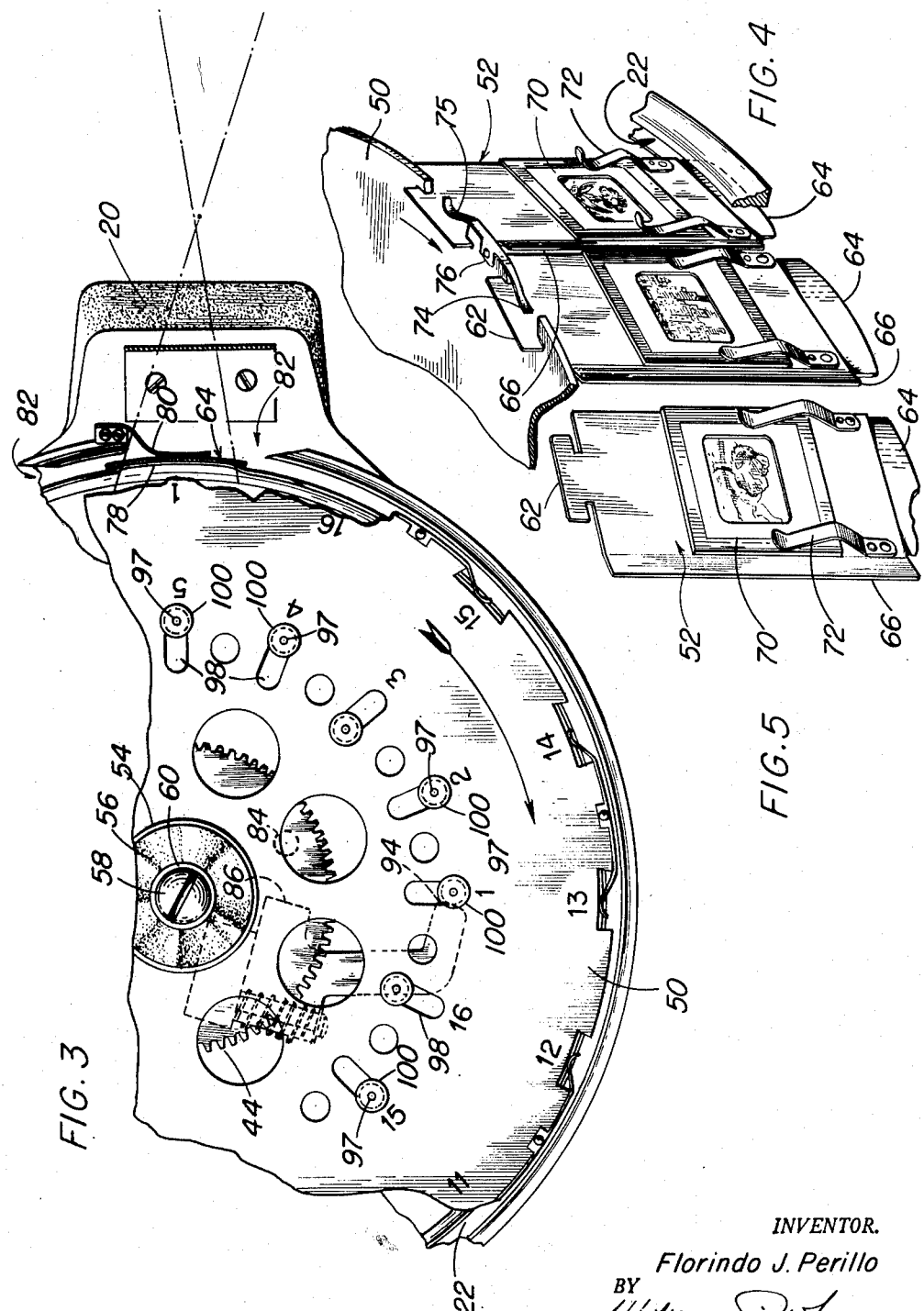

2,609,726

UNITED STATES PATENT OFFICE 2,609,726

MULTISLIDE AUTOMATIC TURNTABLE PROJECTOR

Florindo J. Perillo, Tucson, Ariz.

Application June 6, 1950, Serial No. 166,332

3 Claims. (Cl. 88—27)

This invention relates to a projector for successively and repeatedly projecting on a screen the pictures on a plurality of slides, such as "Kodachrome" transparencies. The projector is particularly intended for the projection of a plurality of slides for display or advertising purposes, but is not to be regarded as limited to those fields.

A particular object of the invention is to provide a device which will not only successively and repeatedly project the pictures from the maximum number of slides which the device may be designed to accommodate, but will also successively project at substantially uniform intervals the pictures on less than the maximum number of slides. Other objects are to provide slide carrying means in the form of a flat disk or turn-table from which slide-holders are suspended, thus providing a very inexpensive construction; to provide said turn-table with an adjustable stop for each slide-holder by which it may be held stationary in projection position or be made to pass without stopping; and to provide means for aligning the slides for projection. The invention will be apparent from the following description of a preferred embodiment taken in connection with the accompanying drawings in which Fig. 1 is a slide elevation, partly in section, of the projector; Fig. 2 is a fragmentary elevation of the parts of the projector which cause intermittent rotation of the turn-table by which the slides are supported; Fig. 3 is a fragmentary plan view of the turn-table and base of the projector; Fig. 4 is a fragmentary perspective view showing adjacent slide-holders and how they are supported from the turn-table; and Fig. 5 is a perspective view of a single slide-holder.

From Fig. 1 it will be apparent that the various parts of the projector are supported on a base 20, preferably of cast metal or molded plastic, having on its upper side circular ribs defining a groove 22 for a purpose hereinafter described. Mounted on the base 20 are the elements of a lamp and lens system (of conventional form) which provides the light beam. As shown, this lamp and lens system comprises a lamp 24, a reflector 26, a heat absorbing lens 28, condenser lenses 30 and 32 and a focusing projection lens 34.

Mounted on posts 35 projecting upwardly from the base 20 is a spider 36 having a hub 37 which supports a mechanism (of conventional form) having a motor 38 one end of the shaft of which carries a worm gear (not shown) which drives a gear 40 secured to a shaft carrying at its upper end a pinion 42 which cooperates with a large gear 44 mounted on a vertical shaft 46 which is journaled in the hub 37 of the spider 36. The other end of the shaft of the motor 38 may be provided with a fan (not shown) which circulates air through the space within a baffle 39 for cooling the lamp 24 and the parts adjacent thereto.

Rotatably mounted on the shaft 46 is a turn-table 50 from the edge of which slide-holders 52 are suspended in a manner hereinafter described. The turn-table 50 is driven from the gear 44 through a frictional driving connection of any suitable kind. As shown in Figs. 1 and 2, the turn-table 50 is provided at its center with a hub 54 which is rigidly attached to the turn-table and has a hole which receives the vertical shaft 46; and the bottom surfaces of said hub 54 frictionally engages the upper surface of the gear 44. A dished spring washer 56 surrounds the end of the shaft 46 which projects above the hub 54, and this dished washer 56 is compressed at its central portion by a screw 58 which enters a threaded hole in the end of the shaft 46 and cooperates with a washer 60 which engages the top of the dished washer 56. Thus the dished washer 56 is put under compression and by its engagement with the hub 54 tends to hold the bottom surface of the hub 54 in frictional engagement with the top surface of the gear 44. Therefore, the frictional engagement between the gear 44 and the hub 54 causes the turn-table 50 to rotate with the gear 44, but permits the turn-table 50 to be stopped (as hereinafter described) while the gear 44 continues its rotation.

As best shown in Figs. 3 and 4, the turn-table 50 is provided at its outer edge with notches which are adapted to receive the upper ends 62 of the slide-holders 52 which have the form illustrated. The slide-holders 52 have a curved bottom portion 64 adapted to travel in the groove 22 in the base 20, thereby guiding the slide-holders in their path of movement due to the rotation of the turn-table 50. Each slide-holder 52 is preferably provided with an offset edge 66 which overlaps the edge of the adjacent slide holder, thereby substantially preventing the passage of light between adjacent slide-holders; and each slide-holder 52 is provided with a square opening 68 with which a slide 70 (as shown) in Fig. 4) cooperates. Said slides 70 are removably held in position on the slide-holders by the clips 72 as shown. As will be apparent from Figs. 4 and 5, the top ends 62 of the slide-holders 52 are so formed that they are adapted to cooperate with the slots in the edge of the turn-table 50. The top ends 62 of the slide-holders 52 are retained in said slots by means of springs 74 and 75 extending in opposite directions from a base portion 76 which is attached to the turn-table 50 near its edge. The springs 74 and 75 thus retain the upper ends 62 of the slide-holders 52 in the slots in the edge of the turn-table 50, but permit easy insertion and removal of the slide-holders.

As shown at the right side of Fig. 3, the inner wall of the circular slot 22 is provided beneath the light beam with a bulge 78 which cooperates with the inner surface of the bottom curved portions 64 of the slide-holders 52. A leaf spring 80 mounted on the base 20 cooperates with the outer surface of the curved portions 64 of the slide-holder 52. Thus the bulge 78 and the spring 80 cooperate to retain the bottom of each slide-holder 52, aligning the slides in position for projection and holding them against vibration while the beam of light is being projected through the slide supported by that slide-holder. As indicated at 82 in Fig. 3, the outer wall of the groove 22 in the base 20 is provided with openings through which the bottom portion 64 of a slide-holder may be swung out of the groove 22 in either direction when a slide-holder is being inserted in or removed from the slots in the edge of the turn-table 50. Of course such openings may be provided at other positions in the outer flange forming the groove 22. It will be noted that the slide-holders hang freely in the groove and no frictional resistance to the turning of the turn-table 50 is presented except by the spring 80 which need not exert much pressure. This spring may, if desired, be replaced by a fixed member allowing a slight clearance yet adequate to accurately position the slides.

The means by which the turn-table 50 is periodically stopped while the picture on a slide is being projected, will now be described. As is best shown in Figs. 1 and 2, the gear 44 is provided with a cam 84 (or a plurality of such cams) which cooperates with the end 86 of a detent 88 which is pivotally mounted on a stud 90 extending from the frame of the driving mechanism; a spring 92 being provided which tends to rotate the detent 88 in a counter-clockwise direction, thereby causing the end 86 of the detent to ride on the bottom surface of the gear 44 and over the cam (or cams) 84. The detent 88 is also provided with an upwardly turned end 94 which cooperates with adjustable stops 96 carried by the turn-table 50. As will be apparent from Figs. 1, 2 and 3 the stops 96 are adjustable in radial slots 98 in the turn-table 50; and each stop 96 is provided with a threaded stud 97 carrying a knurled nut 100 which may be manually loosened and tightened when movement of a stop 96 in its radial slot 98 is desired. As will be apparent from Fig. 3, when an adjustable stop 96 is at the outer end of its slot 98 said stop will be in its active position, that is, in a position to engage the end 94 of the detent 88 if the end 86 of the detent is not being engaged by the cam 84; and when a stop 96 is located at the inner end of its slot 98 said stop 96 will be in its inactive position, that is, out of a position to engage the end 94 of the detent 88.

When the projector is being used at its maximum capacity, that is with a slide in each of the slide-holders 52, all of the stops 96 should be located at the outer ends of the radial slots 98. Under that condition, the turn-table 50 will be intermittently rotated through the frictional driving connection (hereinbefore described), whenever the cam (or cams) 84 engages the end 86 of the detent 88 and moves the end 94 of the detent out of engagement with a stop 96; and the rotary movement of the turn-table 50 will continue until the end 94 of the detent 88 engages the next stop 96, whereupon the turn-table will stop rotating until the cam (or cams) 84 again depresses the detent 88. Thus the slides 70 carried by the slide-holders 52 are successively brought into the projecting beam of light, and the pictures on the slides are successively projected on the screen. In the event that the projector is designed (for example as shown) to accommodate 16 slide-holders and there are two diametrically oppositely located cams 84 and the gear 44 is driven at the rate of one revolution every 20 seconds, then (when every slide-holder contains a slide) it is obvious that the length of time during which each picture will be projected will be about 8¾ seconds, and that the time required between projections for the movement of the slide-holders will be about 1¼ seconds.

When the projector is used with less than the maximum number of slides, the stop or stops 96 corresponding to the slide-holders 52 which are empty are moved to the inner ends of the radial slots 98. In order to facilitate the choosing of the stop 96 which corresponds to an empty slide-holder, notations are preferably provided on the top surface of the turn-table 50, as shown in Fig. 3 from which (for example) it will be apparent that the stop numbered "1" corresponds to the position "1" of the particular slide-holder that is in the beam of light. The other notations "2" to "16" indicate the stops which correspond to the other slide-holders which are suspended from the turn-table 50. As hereinbefore explained, when a stop 96 (corresponding to a slide-holder which is empty) is in its inactive position at the inner end of its slot, the end 94 of the detent 88 will not engage that stop, and the turn-table will continue its rotation until the detent end 94 engages the next stop 96 which is in its active position at the outer end of its radial slot 98. Thus, if one or several slides are omitted, the projection of the picture on the slide following the omission will occur after an interval which is only a little longer than the interval between the projection of pictures when all of the slide-holders contain slides. Empty slide-holders will preferably have the apertures 68 covered by sheets of opaque material such as cardboard, carried in the clips 72 so that they will block off the light as the holder passes the projection lens. Thus to one viewing the screen projection will appear to be at substantially uniform intervals even where slides are omitted.

The embodiment herein described is to be taken as merely illustrative of the invention which is not limited to the details thereof.

What is claimed is:

1. A projector for successively and repeatedly projecting on a screen the pictures on a plurality of slides, comprising a lamp and lens system providing a light beam, a motor-driven mechanism, a turn-table provided with radial slots and arranged to be rotated by said mechanism through a frictional driving connection, means cooperating with said turn-table for supporting a plurality of slides in positions to be interposed in the path of the light beam as said turn-table rotates, and means for periodically stopping the rotation of said turn-table and manually movable in said slots from one end to the other and comprising, stops carried by said turn-table equal in number to the number of slides which are supportable by said turn-table, a movable detent normally in the path of said stops when they are located at one end of said slots, and means movable with said driving mechanism for periodically and temporarily moving said detent out of engagement with a stop, thereby permitting said turn-table to rotate until the detent engages another stop whereupon the rotation of the turn-table is prevented until the detent is again moved out of engagement with that stop.

2. In a projector for successively and repeatedly projecting on a screen the pictures on a plurality of slides, a lamp and lens system providing a light beam, a base having a circular and vertically-extending groove, a turn-table horizontally arranged for rotation on the axis of said groove, said turn-table being provided in its edge above said groove with notches, and a plurality of slide-holders each having an upper portion cooperating with a notch in the edge of said turn-table thereby hanging said slide-holders from said turn-table with the lower portions of said slide-holders in position to travel in said groove, and a spring cooperating with said groove and with the lower portions of each hanging slide-holder as it arrives in the path of the light beam as said turn-table rotates thereby temporarily pressing the slide-holder against a wall of said groove.

3. In a projector for successively and repeatedly projecting on a screen the pictures on a plurality of slides, a lamp and lens system providing a light beam, a base having a circular and vertically-extending groove, a turn-table horizontally arranged for rotation on the axis of said groove with the edge of said turn-table approximately above said groove, a plurality of slide-holders, means for attaching the upper portion of each slide-holder to the edge of said turn-table so that it hangs therefrom with the lower portion of the slide-holder in said groove, and a spring cooperating with the lower portion of each slide-holder as it arrives in the path of the light beam as said turn-table rotates thereby temporarily pressing the lower portion of that slide-holder against a wall of said groove.

FLORINDO J. PERILLO.

REFERENCES CITED

The following references are of record in the file of this patent:

UNITED STATES PATENTS

| Number | Name | Date |
| --- | --- | --- |
| 1,275,791 | Thereault | Aug. 13, 1918 |
| 1,493,618 | Dumont | May 13, 1924 |
| 1,581,228 | Sierra et al. | Apr. 20, 1926 |
| 1,619,155 | Price | Mar. 1, 1927 |
| 1,776,207 | Wagner | Sept. 16, 1930 |
| 2,003,890 | Jones | June 4, 1935 |
| 2,303,084 | Levy | Nov. 24, 1942 |
| 2,319,284 | Zwirn | May 18, 1943 |

FOREIGN PATENTS

| Number | Country | Date |
| --- | --- | --- |
| 331,029 | France | July 17, 1903 |
| 205,788 | Great Britain | July 17, 1924 |
| 423,154 | Germany | Dec. 21, 1925 |
| 308,987 | Great Britain | May 15, 1930 |
| 538,059 | Great Britain | July 18, 1941 |